WILLIAM C. BOYCE
*INVENTOR.*

AGENT

Sept. 13, 1966 W. C. BOYCE 3,271,797
IMPACT PROTECTIVE DEVICE
Filed Dec. 6, 1962 2 Sheets-Sheet 2

WILLIAM C. BOYCE
*INVENTOR.*

BY H.C. Goldwire
AGENT

United States Patent Office 3,271,797
Patented Sept. 13, 1966

3,271,797
IMPACT PROTECTIVE DEVICE
William C. Boyce, Dallas, Tex., assignor to Ling-Temco-Vought, Inc., Dallas, Tex., a corporation of Delaware
Filed Dec. 6, 1962, Ser. No. 242,824
7 Claims. (Cl. 5—348)

This invention relates to paddings and cushions for enhancing comfort or affording protection from accelerations and more particularly to improved means for affording protection from impact accelerations.

The effects of large accelerations on the occupants of advanced hypersonic vehicles are a prime consideration in setting upper limits on the vehicle flight dynamics; and, even with backward-facing seats and restraining belts, accelerations in the event of a crash are frequently of magnitude sufficient to be devastating to the crew and passengers of commercial aircraft. Acceleration problems tend to be even more acute in space vehicles of both the ballistic and gliding atmospheric entry types, in which the crew is routinely placed under more or less extreme stress at times including boost, entry, and landing. Also, in vehicles other than aircraft and space vehicles, the effects of occupant accelerations or vibrations can be of vital importance. For purposes of explanation, the present invention will be described as utilized in a space vehicle, but it will be understood that the invention is by no means limited to such utilization.

In a space vehicle, accelerations imposed upon an occupant of the vehicle may be divided into two classes, and one of these classes includes the moderate-to-severe, relatively long-duration accelerations involved in large velocity changes. Under the present state of the art, gravity (G) levels of 6 to 9 G's which are sustained for minutes and of 20 G's for seconds are required in practical operation of space vehicles.

The second highly significant class of acceleration includes impact accelerations, which are typified by a high peak magnitude, high rate of onset, short duration, and rapid decay. Impact accelerations are produced, for example, by the landing impact of a parachute-recovered capsule. The profile of such an acceleration is a sharp spike, and a true impact acceleration has been regarded (P. R. Payne, The Dynamics of Human Restraint Systems, paper presented at the National Academy of Sciences Symposium on Impact Acceleration, Denver, Colorado, November 1961) as an acceleration pulse occurring so rapidly that the force input is over before the mass involved reacts to the force. It is largely to the problem of enabling the human body to withstand this class of accelerations that the present invention is addressed.

The characteristics of flight of manned flight vehicles of course must be limited to prevent the imposition, on the vehicle occupant or occupants, of acceleration forces exceeding levels contemporaneously known and accepted as safely tolerable. Since at present the recognized G-tolerances of the mechanical components of the vehicle are readily made to exceed the recognized human G-tolerance, the latter acts as a distinct limitation on the permissible performance of the vehicle. To raise vehicle performance, then, greater acceleration loads must be placed on the vehicle crew or improved means devised for attenuating increased vehicle accelerations. The present invention is of great desirability, therefore, because of its ability to increase markedly the utilization of the inherent tolerances of men to impact acceleration stresses. In this connection, whereas under some conditions an apparently mild impact may prove fatal, cases have been recorded in which humans involved in free-fall impacts have been exposed to acceleration which, upon analysis, indicate that men can tolerate impact stresses of astonishing proportions. Humans have without significant injury survived impact accelerations of over 100 G's and thus have demonstrated a physiological tolerance for impact forces far over the values currently accepted as safe. Survival in such cases has strongly suggested that, with adequate restraint and support, the demonstrated level of human tolerance to impact can be considerably increased.

A source of injury lies in the localized application of pressure, and this is best avoided, in use of a restraint-support device, by providing a sufficiently large area of surface contact between the device and the supported body member. To provide a maximum of uniformly loaded contact, the support device must be contoured to fit the body member. To avoid the injuries accompanying the extensive excursion of a first body element relative to a second, adjoining body element, the support means for both elements must be rigid and in fixed spatial relationship. Furthermore, the restraint-support device must be conducive to proper posture, for susceptibility to impact damage is increased radically when there is deviation from optimum initial alignment of body components: for example, misaligned vertebrae are much more apt to be chipped or crushed at their edges. Proper initial alignment is best ensured by a rigid restraint-support system which is positioned to provide best orientation of the crew member relative to the direction of the impending acceleration. The best restraint-support device, hence, is both rigid and contoured to provide broad surface contacts which tend to maintain the natural shapes of the body elements supported.

An added factor dictating rigidity in the support means is the necessity of avoiding rebound and G overshoot. Both the restraint-support system and the crewman experience elastic deformation on impact, and the elastically absorbed energy is returned in elastic response or rebound. In addition, the elastic and plastic properties of the man and restraint-support system tend to prevent the crewman from following the acceleration-time profile of the impacting vehicle. The result is a "catching up" and accompanying G overshoot in which the crewman exceeds the rate of onset and peak amplitude of the vehicle acceleration. Accelerations brought about in this manner are by no means insignificant: readings of 1.5 to 2.0 times the vehicle acceleration have been recorded on the crew member. By far the best remedial measure is to utilize materials of high modulus of elasticity in the restraint-support system and employ a stiff type of construction.

Especially disadvantageous in the rigid, contoured restraint-support shell, particularly in the case of the torso, is the requirement for individual fit of each crew member. The difficulties in molding a rigid shell to fit an individual arising from the flexibility of human flesh, posture characteristics, etc. are aggravated, in the case of the torso, by necessary movements occasioned by breathing. Thus, the need for providing individually contoured support for a number of crewmen tends to create a major problem of logistics. As will be seen, problems of comfort also have previously tended to detract from the concept of rigid, contoured support.

For prevention of injuries to the crewman, sharp blows, especially localized blows, to any part of the body should be avoided, and loose restraint can produce sharp blows at the time of impact. Body members, therefore, should be snugly contacted against broad bearing surfaces of the restraint-support device prior to impact. Prior arrangements providing the necessary snug contact have had the disadvantages of discomfort, immobility of limbs, etc. Comfort requirements in space systems are severe; under certain flight routines, a crewman must remain seated or reclined in a restraint-support system from hours to several days. Under these conditions, comfort is transformed from a desirable goal to a vital consideration because of its controlling effect on crew efficiency. Even where restraint may largely be dispensed with during the majority of the time of a mission, it would be extremely desirable to permit at least enough movement of arms and particularly of legs, during actual restraint, to maintain circulation and muscle tone. This desirability, however, has been rendered largely unattainable by the tightness of restraint needed for avoiding sharp blows upon impact. Even during periods of relaxation of restraint, it is contemplated that the provision of special exercise equipment will be required for long missions. Also, even where faithfully contoured to fit the related body members, a rigid shell or other rigid restraint-support device is hard and unyielding and tends to become extremely uncomfortable after the passage of a certain time. Paradoxically, the ideal restraint-support device would be soft and yielding except at the instant of impact, at which time it would be hard and rigid.

It is, accordingly, a major object of the present invention to provide a restraint-support device which enables a man to realize more fully his inherent abilities to withstand impact accelerations.

A closely related object is to provide improved means for protection of a man or inanimate object from damages tending to result from impact accelerations.

Another related object is to increase vehicle performance capabilities by enabling occupants of the vehicle to withstand greater impact accelerations of the vehicle.

Still another object is to provide a restraint-support device including means for obtaining as broad and uniform a distribution as possible, on the body restrained, of restraint-support loads.

A further object is to provide a support device which yields to permit motions of a body member restrained in snug, large-area contact therewith and which is virtually rigid and unyielding on impact.

An additional object is to provide a restraint-support device which is relatively soft and yielding under slowly applied loads, yet is rigid and unyielding under impact accelerations.

Yet another object is to provide a restraint-support device which is largely self-contouring and in which problems of individual fit are much reduced, yet which, as stated above, is virtually rigid upon impact.

A still further object is to provide a restraint-support device which is yielding and conformable and yet is of high modulus of elasticity under impact loadings and hence not conductive to rebound and related sources of increased accelerations.

An additional object is to provide a restraint-support device of utility as an exercising apparatus.

Other objects and advantages will be evident from the specification and claims and the accompanying drawing illustrative of embodiments of the invention.

Figure 1:
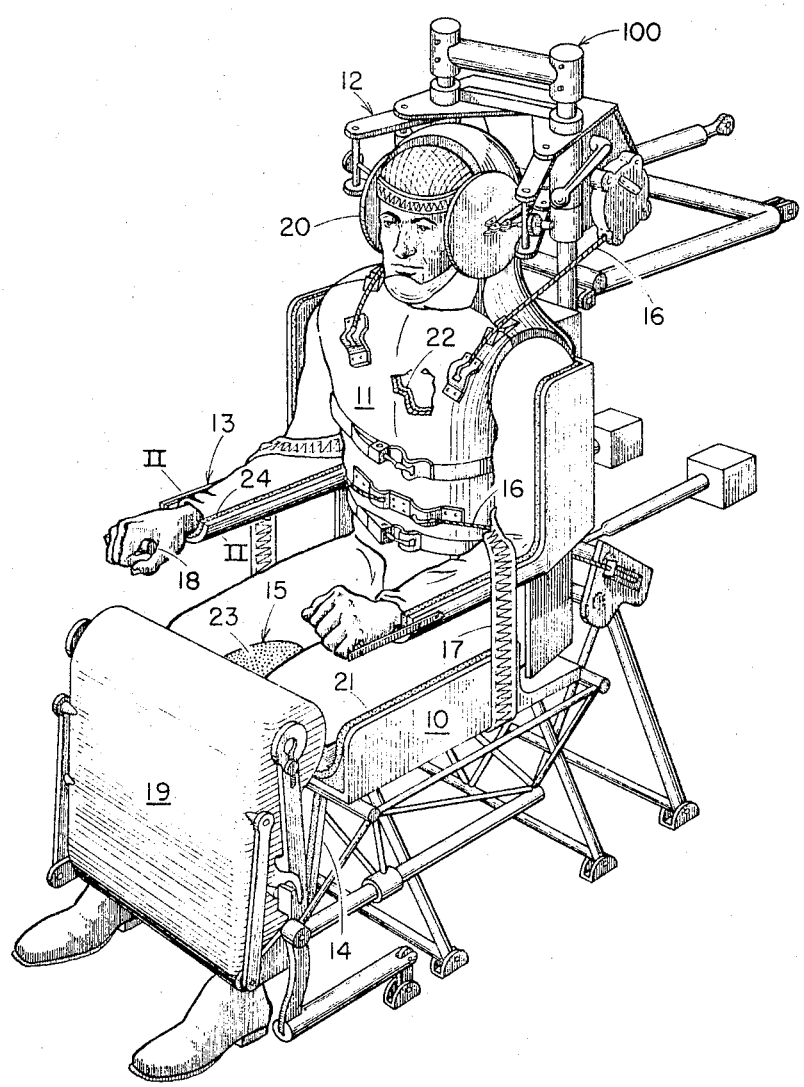
FIGURE 1 is a perspective view of a restraint-support system utilized by a crewman and employing the present invention.

With reference to FIGURE 1, a restraint-support system includes a seat assembly 100 comprising a tubular, metallic frame which supports items including a head restraint 12, leg backrests 14, leg cover 19, and a seat pan 10 which preferably is removable, where the crew consists of more than one person, to permit its being changed from one crew station to another. A rigid hard-shell 11 encases the torso of the crewman, and cables 16 extending between the seat assembly 100 and hard-shell provide torso restraint; other body parts are restrained by arm straps 17, hand grips 18, the leg cover 19, and head-support pads 20. A pair of arm rests 13 are adjustably mounted on any suitable, adjacent structure (not shown), for example the vehicle wall. As is known in the art, the body-contacting surfaces of the hard-shell 11, seat pan 10, armrests 13, etc. are contoured in complement to the body parts contacted and, according to the present invention, are lined with a novel construction such as may be seen at 21, 22, 23, and 24 and which will now be described.

Figure 2:
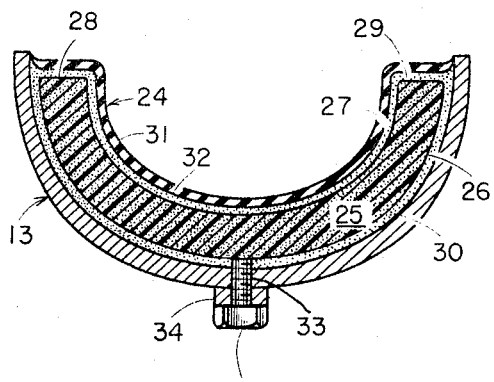
FIGURE 2 is a sectional view taken as at line II—II of FIGURE 1, the occupant's arm being omitted from the view.

In FIGURE 2, the arm rest 13 is at least approximately contoured in complement to the contours of an arm of an intended user, although the fit need by no means be perfect. Lack of perfect fit is acceptable because, for one thing, a laterally supported arm has relatively good tolerance to laterally imposed impact accelerations, but more importantly because, as will be seen, the lining construction 24 provided by the present invention permits much wider tolerances in the contouring of the restraint-support components. The arm rest 13 is of metal or other rigid, fluid-impervious material and cooperates with the remaining components of the invention as will become apparent.

The arm rest 13 constitutes a backing and is lined with a body 24 comprising a layer of pliable, open-celled, foamed, plastic material 25, the term "plastic" being employed herein as inclusive of rubber and similar materials (neoprene, etc.). The term "foamed" refers to open-celled materials including, for example, sponge rubber. While a number of plastic materials are suitable, the plastic material of the specific embodiment shown in FIGURE 2 is a synthetic resin such as polyurethane. In a preferred example, the polyurethane foam 25 is of a density of approximately 4 lb./ft.$^3$ and is ⅝ inch in thickness. This body 24 of plastic material 25 has first and second faces 26, 27 connected by edge surfaces such as 28, 29, additional edge surfaces at the ends of the body 24 of course not appearing in the sectional view. Means are provided for bonding the backing 13 to the foamed body first face 26; where the foamed material is polyurethane, a suitable bonding material is a poly-functional mercaptan adhesive 30 such as that sold by the Thiokol Corporation of Trenton, New Jersey under the name of LP-2 and having an average structure of

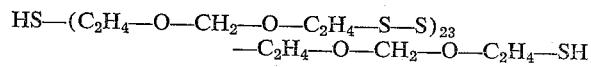

This adhesive is, of course, combined with a suitable catalyst such as the lead oxide catalyst marketed under the name "Proseal 727 Catalyst" by the Coast Proseal and Manufacturing Co., Los Angeles, California. It is necessary that the cells of the foamed body be sealed off from the body exterior, and this is readily achieved by utilizing the adhesive, in cooperation with the backing, as follows. Mix 90 grams of "LP-2" with 10 grams of toluene and 10 grams of "Proseal 727" catalyst. To remove air bubbles which could result in pinholes in the adhesive 30, apply vacuum at 27 inches of mercury to the mixture for 5 minutes. Using the thinnest coat that will afford liquid-tight coverage, apply the mixture to the backing 13 with a serrated spreader or a brush with short bristles. Cure 16 hours at room temperature or ½ to 1 hour at 140° F. Next, prepare a mixture of 90 grams of "LP-2" with 10 grams of "Proseal 727" catalyst and apply to the foamed body first face 26 with a wooden spatula or serrated spreader. Use the thinnest coat that will seal the cells at the foamed body surface 26 and avoid excessive pressures which would cause the mixture to penetrate into the main body of the foam. Lightly press the foamed body 25 into place on the backing. Take care to ensure that the backing 13 adheres to all the area of the foamed body first surface 26.

The pliable, fluid-impervious skin is preferably made of a plastic material which, in one example, is a liquid polyurethane elastomer cured to form a tough, pliable coating bonded over the foamed body 25 through a sealing coat 32. To seal the exposed surfaces of the foamed body 25 prior to applying the skin 31, mix 90 grams of "LP–2" with 10 grams of "Proseal 727" catalyst, vacuum as above, and apply a smooth, uniform, liquid-tight coat 32 to the edge surfaces 28, 29 and second face 27 of the foamed body 25. Do not force the mixture down into the foamed body 25, and form a smooth overlap of the "LP–2" onto the backing 13 where the foam and backing meet. Cure for ½ to 1 hour at 140° F. or 16 hours at room temperature, then proceed with mixture of the skin materials. These comprise, in one embodiment, a liquid polyurethane elastomer such as marketed under the name of "Proseal 793" by the Coast Proseal and Manufacturing Co., Los Angeles, California; a diisocyanate curing material such as sold by the same concern as "Proseal 793 catalyst," and methyl isobutyl ketone. These are admixed in the proportions of 13.3 grams of "Proseal 793 catalyst," 30 grams of methyl isobutyl ketone, and 50 grams of "Proseal 793" resin. After applying a 27-inch vacuum for 60 minutes, a thin, uniform coat 31 of the mixture is sprayed over the second face 27 and edge surfaces 28, 29 (including the end edges, not shown) of the foamed body 25. Further coats are applied to build the skin 31 to the desired thickness. An air cure of 2 hours between coats is ordinarily sufficient; cure the final coat for 4 hours or more at 180° F. The sprayed material forms a strong, pliable, fluid-impervious skin 31 which is bonded to all the area of the second face 27 and edge surfaces 28, 29 through the "LP–2" sealing coat 32 applied to the second face and edge surfaces of the foamed body 25. The skin 31 forms, with the backing 13, a fluid-impervious enclosure or envelope containing the foamed body 25.

While not shown in the drawing because the nature of the case does not admit of it, the cells of the foamed body 25 are filled, to as complete exclusion as possible of air, with a liquid. In a representative embodiment, this liquid is water; other liquids (for example, silicone oil or other bland oils or other liquids) may be employed. The liquid selected should not react chemically with or act as a solvent for the other components of the device.

After applying the skin 31, the air in the device is replaced by water. This may be accomplished through the use of hypodermic needles inserted through the skin 31, the needle punctures subsequently being suitably sealed. Preferably, however, at least one port 33 is utilized which extends to the foamed body 25 from the exterior of the latter. A preferred location of the port 33 is in the backing 13. To provide a convenient means of closing the port 33, a nut 34 is welded or otherwise attached on the backing 13 in such manner that its threaded bore forms a continuation of the port, which extends through backing 13 and whose closure is effected by threading a screw 35 into the nut 34. While only one port 33 is shown, at least two preferably are employed in spaced relation to each other to facilitate air removal and water filling. In application of the adhesive, of course, the port 33 is left open and the portion of the foamed body first surface 26 in register with the port 33 is left bare, and this construction is employed at each port. Filling is preferably accomplished by closing one port and attaching a vacuum line to the other. The device is evacuated to a vacuum of at least 27 inches of mercury, whereupon the device is immersed in water with the port such as 33 attached to the vacuum line as high as possible relative to the other port. With the vacuum line restricted, the plug such as 35 is removed from the other port, then limited flow is allowed through the vacuum line. When the vacuum line flow is air-free, the line is disconnected from the device, which then is soaked 15 minutes or more in the water in which it is immersed. The screws such as 35 are then installed to plug both ports and the device is removed from the water.

Figure 3:
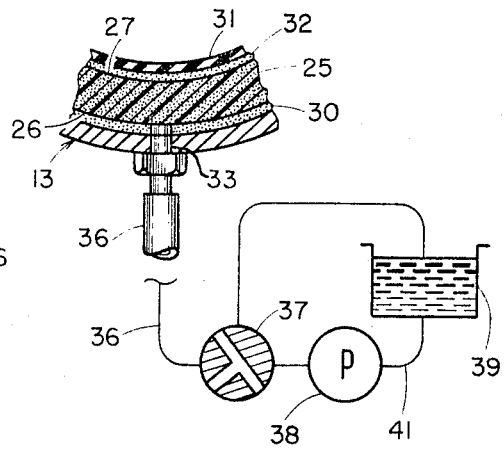
FIGURE 3 is a fragmentary view similar to FIGURE 2 and showing a means for varying fluid pressure in the liquid filling the foamed body.

Means are provided, where desired, for varying fluid pressure in the liquid filling the foamed body 25. Such means may take the form of, for example, a line 36 (FIGURE 3) connecting a port 33 communicating with the interior of the device through a valve 37 with a pump 38 or a reservoir 39. It is readily seen that the valve 37 may be positioned as shown for holding fluid pressure in the foam 25 constant, rotated to the right for permitting escape of liquid from the foam 25 through lines 36, 40 to the reservoir 39, or rotated to the left for receiving liquid from the reservoir 39 through lines 41, 36 and the pump 38; oscillation of the valve 37 between right and left will produce pulsations of liquid pressure in the foam 25.

While the invention, as shown at 24, has been described only in connection with the arm rest 13, it will be understood that it is similarly applied in other locations as, in FIGURE 1, at 21, 22, 23.

Under sustained one-G or other moderate acceleration conditions, the device, because of the pliability of the skin 31 and foam 25 and yieldability of the liquid filling the foam, is soft and yielding and hence conforms to the contour of the body areas with which it is in contact. Because it then is self-contouring, a much greater tolerance is permissible in the molding of the backing 13 in complement to the individual human body, and problems of individual fit are much alleviated. Under slowly applied loads, the liquid readily is forced from place to place in the foamed body 25 through the interconnected cells but because of the baffling and capillary action of the foamed material does not slosh or puddle. Even when restraint is tightened and the human body bears snugly against the device, the device yields to permit some motions helpful in maintaining circulation and muscle tone. Open-celled foamed materials (air-filled) such as pliable synthetic resins and sponge rubber previously have tended not to be suitable in restraint-support devices because of their low modulus of elasticity and propensity toward inducing rebound; but when filled with a liquid as herein disclosed, their behavior under impact is completely changed. Because of liquid incompressibility and the resistance to liquid flow imposed by the cells of the foamed body 25, and because of the short onset and duration of impact, the liquid-filled, foamed body 25 approximates, at impact, a rigid solid of high modulus of elasticity and very low rebound. Since applied pressure is evenly distributed throughout a liquid, and since the close conformity of the device to the body prior to impact has already brought it into intimate, wide-area body contact, impact pressure is applied evenly, in a given plane, to all points of the body areas contacted. Accordingly, the greatly improved uniformity of distribution of impact pressure on the crewman and the rigid support by a device of high modulus of elasticity enables the crewman to realize more fully his inherent abilities to withstand impact accelerations. As a consequence, the crewman is better protected and less susceptible to injury from an impact of given magnitude, and greater impact accelerations may be imposed on the vehicle without deleterious effect on the crewman (or passenger) utilizing the device. During impact-free flight, the pump 38 (FIGURE 3) may be utilized as desired to vary the liquid pressure for maximum comfort, and alternation of connection of the foamed body 25 to the pump 38 and reservoir 39 through valve 37 provides a pulsating variation of liquid pressure in the device. Such pulsations, which may be utilized in a cyclic manner, produce a massaging effect and add much to comfort by relieving numbness or pain occasioned by long sitting, etc. and, by promoting circulation and muscle tone, add much to the comfort and efficiency of the crewman.

Figure 4:
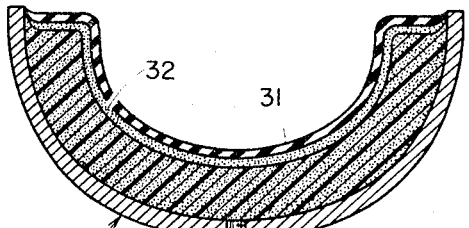
FIGURE 4 is a fragmentary view similar to FIGURE 2 and showing a foamed body self-bonded to the backing.

In a modification of the device shown in FIGURE 4, no added bonding means is employed to attach the foamed body 25 to the rigid backing 13; instead, the body 25 is foamed in place, using well-known technics, and hence is self-bonded to the backing 13. The polyurethane foams are an example of foams with excellent self-bonding characteristics.

Figure 5:
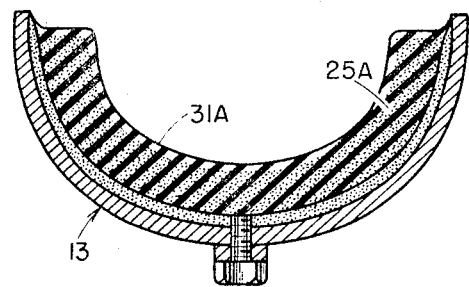
FIGURE 5 is a fragmentary view similar to FIGURE 2 and showing a rubber foamed body with an integral skin.

In FIGURE 5, the foamed body 25A is, for example, made of a foamed or sponge rubber and the skin 31A is made integral therewith according to technics well known in the art of fabrication of sponge rubber. The skin 31A is made thick and strong enough to withstand the pressures imposed by the crewman without rupture. As before, the fluid-impervious skin 31A and backing 13 form a fluid-tight enclosure or envelope containing the foamed body 25A.

Figure 6:
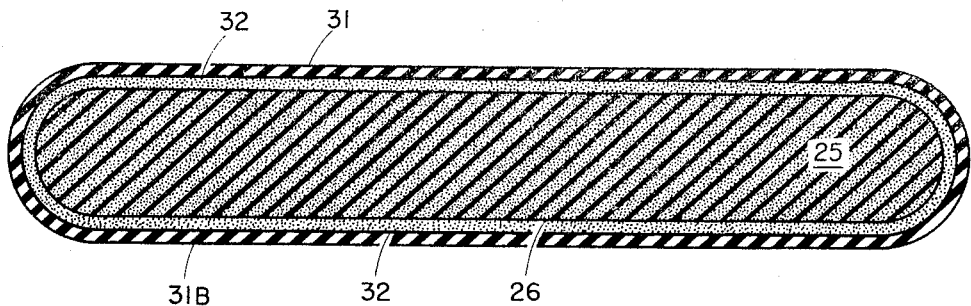
FIGURE 6 is a sectional view of a pad according to the present invention in which the skin continues over the foamed body first face.

In some useages of the invention, it will be desired to dispense with the rigid backing 13 and employ a skin 31B (FIGURE 6) over the first face 26 which is continuous with the remainder 31 of the skin. The sealing coat 32 is applied over all surfaces of the foamed body 25. In this form, the device is of general utility for many applications additional to protection from high-impact accelerations. Because of the presence of the foamed body 25 and the incompressibility of the liquid filling the same, not nearly as much initial fluid pressure is necessary in the device as in a pneumatic cushion to enable it to stand up under a given, steady loading from the body of a person using the device.

While only one embodiment of the invention, together with modifications thereof, has been described in detail herein and shown in the accompanying drawing, it will be evident that various further modifications are possible in the arrangement and construction of its components without departing from the scope of the invention.

I claim:
1. A pad comprising:
   an open-celled, foamed, flexible, plastic body having first and second faces connected by edge surfaces;
   a rigid, fluid-impervious backing covering and bonded to substantially all the area of the foamed body first face;
   a pliable, fluid-impervious skin covering and bonded to substantially all the area of the foamed body second face and edge surfaces and sealingly attached to the fluid-impervious material to form therewith a fluid-impervious enclosure containing the foamed body;
   and a liquid filling the foamed body.

2. A pad comprising:
   a body having first and second faces and edge surfaces connecting the faces, said body being made of a pliable, open-celled, foamed plastic material;
   a rigid, fluid-impervious backing covering substantially all the area of the body first face;
   means bonding the backing to substantially all the area of the body first face;
   a pliable, fluid-impervious skin covering the body second face and edge surfaces and extending onto the backing;
   means sealingly bonding the skin to the backing and to substantially all the area of the body second face and edge surfaces;
   and a liquid filling the body.

3. A pad comprising:
   a rigid, fluid-impervious backing contoured in at least approximate complement to a member of a human body;
   a pliable, open-celled, foamed, plastic body having first and second faces and edge surfaces connecting the faces, the first face being, over substantially all its surface, bonded to the backing;
   a pliable, fluid-impervious skin covering the body second face and edge surfaces and extending onto the backing;
   means sealingly bonding the skin to the backing and to substantially all the area of the body second face and edge surfaces;
   and a liquid filling the body.

4. The pad of claim 3 wherein the body is foamed in place on the backing and thereby self-bonded to the backing.

5. The pad of claim 3 and further comprising means bonding the body first surface to the backing.

6. A pad comprising:
   a rigid, fluid-impervious backing contoured in at least approximate complement to a member of a human body;
   a pliable, open-celled, foamed, plastic body having first and second faces and edge surfaces connecting the faces, the first face being, over substantially all its surface, bonded to the backing;
   a pliable, fluid-impervious skin covering the body second face and edge surfaces and extending onto the backing;
   means sealingly bonding the skin to the backing and to substantially all the area of the body second face and edge surfaces;
   a liquid filling the body;
   and means for varying fluid pressure in the liquid filling the body.

7. A pad comprising:
   a rigid, fluid-impervious backing contoured in at least approximate complement to a member of a human body;
   a pliable, open-celled, foamed, plastic body having first and second faces and edge surfaces connecting the faces, the first face being, over substantially all its surface, bonded to the backing;
   a pliable, fluid-impervious skin covering the body second face and edge surfaces and extending onto the backing;
   means sealingly bonding the skin to the backing and to substantially all the area of the body second face and edge surfaces;
   at least one port extending to the foamed body from the exterior thereof whereby the foamed body may be filled with a liquid;
   and means for closing the at least one port.

References Cited by the Examiner

UNITED STATES PATENTS

| | | | |
|---|---|---|---|
| 2,750,606 | 6/1956 | Freedlander et al. | 5—347 X |
| 2,908,455 | 10/1959 | Hoadley | 244—117.1 |
| 2,997,100 | 8/1961 | Morris | 5—348 |
| 3,038,175 | 6/1962 | Faget et al. | 5—361 |
| 3,059,251 | 10/1962 | Pollock | 5—361 |
| 3,079,765 | 3/1963 | Le Vantine | 128—402 X |

FRANK B. SHERRY, *Primary Examiner.*

A. M. CALVERT, *Assistant Examiner.*